Patented Aug. 31, 1948

2,448,058

UNITED STATES PATENT OFFICE 2,448,058

PROCESS FOR THE MANUFACTURE OF SODIUM PERCARBONATE

Victor Wallace Slater, Luton, and William Stanley Wood, Harpenden, England, assignors to B. La Porte Limited, Luton, Bedfordshire, England No Drawing. Application July 11, 1944, Serial No. 544,460. In Great Britain August 9, 1943

4 Claims. (Cl. 23—62)

This invention relates to the manufacture of sodium percarbonate.

Various processes have been proposed for the manufacture of sodium percarbonate, for example that described in United Kingdom specification No. 502,319.

It is an object of the present invention to provide an improved process for the manufacture of sodium percarbonate having certain advantages hereinafter referred to.

With this object in view the present invention provides a cyclic process for the manufacture of sodium percarbonate wherein hydrogen peroxide and sodium carbonate are added simultaneously or alternately in small quantities to the mother liquor from a previous precipitation.

In the manufacture of sodium percarbonate according to the process of the present invention the sodium carbonate and hydrogen peroxide are preferably added in the proportion required by the formula $2Na_2CO_3.3H_2O_2$ while maintaining a limited excess of sodium carbonate in solution in the reaction mixture. This reduces the solubility of the sodium percarbonate formed and enables the precipitation to be effected from more dilute oxygen solutions. The excess of sodium carbonate is maintained throughout the making.

In the process of the present invention the sodium percarbonate is precipitated from comparatively dilute oxygen solutions thus minimising the losses due to decomposition. The solubility of the sodium percarbonate may be still further reduced by the addition of sodium chloride or other alkali metal salt such as sodium sulphate. The optimum excess of sodium carbonate has been found to be between 40 and 60 gms. per litre of solution over and above that equivalent to the $H_2O_2$ based on the ratio

$2Na_2CO_3.3H_2O_2$

It is possible to work with a larger excess of sodium carbonate, but this affects the filtration properties of the final product. There is also a tendency for the granular nature of the product to deteriorate as the excess of sodium carbonate is increased. The deterioration in granular nature of the precipitate results in increased quantities of mother liquor being retained by the precipitate and results in increased oxygen losses during drying with an increase in the amount of solids other than sodium percarbonate in the final product.

It was found that the addition of the usual stabilisers was advantageous and that they were best added with the hydrogen peroxide and sodium carbonate in proportionate quantities. It was further found that in the present process the use of sodium silicate as a stabiliser is preferable to magnesium sulphate or magnesium trisilicate. The sodium silicate results in a better and more stable product with a higher yield. The composition of the sodium silicate is relatively unimportant and solutions of sodium silicate with ratios of sodium oxide ($Na_2O$) to silica ($SiO_2$) varying from 1:1 to 1:3.4 may be used with equal satisfaction. The important factor is to standardise the quantity of $SiO_2$ added. It is necessary to employ a quantity of sodium silicate coming within a specified range in order to obtain the most satisfactory results as regards the efficiency and granular nature of the product. It has been found convenient to express the quantity of sodium silicate to be added to the making in terms of grams of $SiO_2$ per litre of hydrogen peroxide of 10 molar strength, i. e. 340 grams $H_2O_2$ per litre of solution. It has been found that to obtain the most satisfactory results the quantity of sodium silicate should be within the range of 6 grams to 27 grams $SiO_2$ per litre of 10 molar hydrogen peroxide. For different strengths of hydrogen peroxide the amount of silicate added is based on the above quantities. For example, if the standard quantity of silicate to be added is fixed at 12 grams $SiO_2$ per litre of 10 molar (34% weight by volume) hydrogen peroxide, then when using 60% weight by volume hydrogen peroxide the silicate added would be 21.4 grams $SiO_2$ per litre of hydrogen peroxide 60% weight by volume. The ratio of $SiO_2$ to available oxygen is, therefore, the same in both cases. After the first two additions of hydrogen peroxide, sodium silicate and sodium carbonate, it may happen that no precipitate of sodium percarbonate is formed but a gelatinous siliceous precipitate separates which is undesirable as it tends to impair the granular nature and filtering properties of the final precipitate. For this reason the addition of the sodium silicate may be delayed until the third addition of hydrogen peroxide, and the quantity added in each addition adjusted accordingly. It has also been found that the addition of stabiliser is best made at the time of the additions of hydrogen peroxide and sodium carbonate, and if the simultaneous method of addition is adopted, the stabiliser should either be added at regular intervals during the making or mixed directly with the hydrogen peroxide. When hydrogen peroxide solutions of high strength, e. g. 60% weight by volume are used it is recommended that the sodium silicate be added directly to the making and not mixed with the concentrated solution of hydrogen peroxide. This avoids the formation of a gelatinous precipitate which is formed when a concentrated solution of hydrogen peroxide and sodium silicate are mixed. When stabilisers of the silicate type are used, the mother liquor must be clear and substantially freed from the siliceous precipitate before it is re-used.

It was also found that the addition of sodium metaphosphate favourably affects the granular nature of the precipitate. The amount of sodium metaphosphate added to the mother liquor may be reduced as the cycle proceeds. It was also found that the hydrogen peroxide may be added in concentrations up to the highest which can be prepared. The process in fact lends itself particularly to the use of solutions of hydrogen peroxide of high concentration, e. g. 60%, thus reducing the amount of mother liquor which has to be rejected owing to excess volume. The mother liquor is filtered or clarified before re-use.

If the additions of hydrogen peroxide and sodium carbonate are alternate then the basis of the additions should be such that the amount of sodium carbonate added at a time should not exceed 20 gms. per litre with the stoichiometric quantity of hydrogen peroxide after allowing for excess sodium carbonate to maintain concentration and the specified quantity of stabiliser. This ensures the granular nature of the product; if more than 20 gms. per litre is added then the granular nature of the percarbonate deteriorates. As previously stated, it is advantageous to have 40 gms. of excess sodium carbonate per litre as a minimum.

The process can be carried out with solutions containing different concentrations of sodium chloride, but in order to reduce the losses due to oxygen decomposition it is best carried out with concentrations of from 200–280 gms. of sodium chloride per litre. The sodium chloride content has an important effect on the yield and stability of the final product. This may be seen from the following figures:

| Solution content | | Results | |
|---|---|---|---|
| NaCl | Excess Na$_2$CO$_3$ | Oxygen loss during making | Oxygen yield as damp percarbonate |
| Grams/litre | Grams/litre | Percent | Percent |
| 270 | 41 | 1.0 | 99.0 |
| 200 | 39 | 4.2 | 92.5 |
| 100 | 38.7 | 6.1 | 84.3 |

Similarly, if the sodium chloride content of the solution is increased above the maximum figure given above, the quality of the precipitate again deteriorates. The salt concentration of the solution may be adjusted either periodically during the making or at the end of the making, the latter being particularly convenient for high strength solutions of hydrogen peroxide where the amount of dilution is small.

The sodium carbonate may be added either in the anhydrous form or as one of the crystalline modifications. In the latter form it is preferably added as fine crystals. The process may be conducted satisfactorily at normal temperatures, i. e. above those generally used in percarbonate manufacture. It may, for example, be carried out even at temperatures as high as 25° C.

The process of the present invention has a number of advantages. Thus, it results in an economy of materials, the loss due to decomposition is reduced to a minimum whilst the process does not require special cooling and may be carried out at normal room temperature and even up to about 25° C. whilst the properties and quality of the sodium percarbonate obtained are satisfactory in every respect. Also, the process of the present invention allows for a very large number of additions to be made due to the granular quality of the product. It has been found possible to make as many as 18 additions of 89 lbs. of hydrogen peroxide of 30.4%, weight by volume to a batch of 500 gallons.

In carrying out the present invention according to a preferred embodiment, the requisite quantity of sodium metaphosphate is added to the clear mother liquor from a previous batch and the temperature is adjusted to not less than 15° C. The first two additions of sodium carbonate and hydrogen peroxide may be made without the addition of sodium silicate. The subsequent additions consist of proportionate quantities of sodium carbonate, and hydrogen peroxide and sodium silicate, the latter two being mixed together when using lower strengths of hydrogen peroxide. The additions may be made at five minute intervals. The time between each addition depends upon the amount of hydrogen peroxide and sodium carbonate added at each addition. As stated previously the maximum amount of sodium carbonate added should not exceed a quantity equivalent to more than 20 grams Na$_2$CO$_3$ per litre. For such a quantity it has been found that the time between additions should be five minutes. For smaller additions it has been found that the time interval may be reduced but should not be less than two minutes. During the making the temperature is allowed to rise to 22° C. and maintained at this figure until the final addition of salt has been made. The batch is then filtered with or without cooling, e. g. to 15° C.

The following examples illustrate how the process of the invention may be carried into effect:

1. 450 gallons of a solution of the following composition: 250 gms. of NaCl per litre, 40 gms. of Na$_2$CO$_3$ per litre, and 2.5 gms. of available oxygen per litre were run into a vat of 700 gallons capacity fitted with an agitator running at 36 R. P. M. To this solution, the temperature of which was 15° C., was added 7½ ozs. of sodium metaphosphate. Over a period of one or two minutes there was added 89 lbs. of hydrogen peroxide containing 30.4 gms. of H$_2$O$_2$ per 100 mls., 0.5 gallon of sodium silicate (Na$_2$O.3.2SiO$_2$) solution of 60° Tw., and 56 lbs. of anhydrous sodium carbonate. The batch was allowed to agitate for 3 minutes after which a further addition of 89 lbs. of the aforesaid H$_2$O$_2$, 0.5 gallon of the aforesaid sodium silicate solution and 56 lbs. of anhydrous sodium carbonate were added over a period of 1 to 2 minutes. The batch was allowed to agitate for 3 minutes and the additions of hydrogen peroxide, sodium silicate and sodium carbonate continued as above until a total of 12 additions had been made. The sodium percarbonate separated as a granular precipitate and there was no sign of decomposition during the process. There was a gradual rise in temperature until after the fourth addition the temperature was 22° C. The batch was maintained at this temperature for the remainder of the process. After the completion of the 12 additions, 250 lbs. of common salt were added to re-adjust the concentration of NaCl which had decreased due to dilution during the process. The batch was cooled to 15° C. and filtered by means of a centrifuge. The filtrate after clarification was used for preparing another batch of sodium percarbonate in the manner described above, whilst the damp residue of sodium percarbonate containing 11.3% of available oxygen was dried without decomposition to give a fine, granular, free flowing, stable powder containing 13.3% of available oxygen. The efficiency of the recovery of the oxygen as sodium percarbonate was equal to 96%. The available oxygen present in the solution at the start of the process represents the solubility of sodium percarbonate in a solution of sodium chloride and sodium carbonate of the concentrations given and at the temperature of the previous filtration.

2. 500 gallons of mother liquor from a previous precipitation were run into a vat and 9 ozs. of sodium metaphosphate were added. There were then made, in the same manner as in Example 1, 11 additions of 57 lbs. of hydrogen peroxide 60% weight by volume
11 additions of 58 lbs. of soda ash
11 additions of 3½ pints of sodium silicate solution (1.30 sp. gr.)

After the 11 additions had been made, 154 lbs. of sodium chloride were added. After cooling to 15° C. the percarbonate was filtered by means of a centrifuge and dried. The dried sodium percarbonate containing 13.74% available oxygen with an overall oxygen yield as sodium percarbonate of 97.3%.

We claim:

1. In a cyclic process for the manufacture of sodium percarbonate by reacting sodium carbonate and hydrogen peroxide to precipitate sodium percarbonate, the improvement which consists in adding hydrogen peroxide and sodium carbonate to a mother liquor from a previous precipitation containing sodium chloride, sodium carbonate and available oxygen as soluble sodium percarbonate, and so controlling the amounts and rates of addition of hydrogen peroxide and sodium carbonate as to maintain the sodium carbonate in solution and the content thereof in the reaction mixture throughout the course of the reaction at between 40 and 60 gms. per liter of solution in excess of the proportion required by the formula $2Na_2CO_3.3H_2O_2$.

2. The process according to claim 1 wherein the hydrogen peroxide and sodium carbonate are added to a mother liquor from a previous precipitation containing, besides sodium carbonate and available oxygen as soluble sodium percarbonate, between 200 and 280 gms. of sodium chloride per liter.

3. The process according to claim 1 wherein the hydrogen peroxide and sodium carbonate additions to the mother liquor are made alternately in increments of which the sodium carbonate additions do not exceed 20 gms. per liter of the reaction mixture and the intervals between the incremental additions are so spaced as to insure substantially complete reaction of the hydrogen peroxide and sodium carbonate present in the mixture before fresh additions are made.

4. In a cyclic process for the manufacture of sodium percarbonate by reacting sodium carbonate and hydrogen peroxide to precipitate sodium percarbonate, the improvement which consists in periodically adding sodium carbonate and hydrogen peroxide to a mother liquor from a previous precipitation containing sodium chloride, sodium carbonate and available oxygen as soluble sodium percarbonate and being otherwise substantially free from hydrogen peroxide, and so controlling the amounts and rates of addition of hydrogen peroxide and sodium carbonate as to maintain the sodium carbonate in solution and the content thereof in the reaction mixture throughout the course of the reaction at least 40 gms. per liter of solution in excess of the proportion required by the formula $2Na_2CO_3.3H_2O_2$.

VICTOR WALLACE SLATER.
WILLIAM STANLEY WOOD.

REFERENCES CITED

The following references are of record in the file of this patent:

UNITED STATES PATENTS

| Number | Name | Date |
|---|---|---|
| 1,225,832 | Liebknecht | May 15, 1917 |
| 1,237,128 | Weber | Aug. 14, 1917 |
| 1,263,258 | Liebknecht | Apr. 16, 1918 |
| 1,950,320 | Muller | Mar. 6, 1934 |
| 1,986,672 | Bergman | Jan. 1, 1935 |

FOREIGN PATENTS

| Number | Country | Date |
|---|---|---|
| 152,366 | Great Britain | Oct. 21, 1920 |
| 502,319 | Great Britain | Mar. 15, 1939 |

Certificate of Correction

Patent No. 2,448,058.                                                                 August 31, 1948.

VICTOR WALLACE SLATER, ET AL.

It is hereby certified that the name of the assignee in the above numbered patent was erroneously described and specified as "B. La Porte Limited" whereas said name should have been described and specified as *B. Laporte Limited*, as shown by the record of assignments in this Office; and that the said Letters Patent should be read with this correction therein that the same may conform to the record of the case in the Patent Office.

Signed and sealed this 5th day of April, A. D. 1949.

[SEAL]

THOMAS F. MURPHY,
*Assistant Commissioner of Patents.*